United States Patent
Neuhaus

[11] Patent Number: 5,967,485
[45] Date of Patent: Oct. 19, 1999

[54] QUICK-ACTION VALVE

[75] Inventor: Dietmar Neuhaus, Duesseldorf, Germany

[73] Assignee: Deutsches Zentrum fuer Luft- un Raumfahrt e.V., Bonn, Germany

[21] Appl. No.: 09/223,307

[22] Filed: Dec. 30, 1998

[30] Foreign Application Priority Data

Jan. 7, 1998 [DE] Germany .................. 198 00 257

[51] Int. Cl.[6] .................................................. F16K 31/02
[52] U.S. Cl. .................. 251/11; 251/129.06; 251/76
[58] Field of Search .................. 251/11, 129.06, 251/129.01, 76

[56] References Cited

U.S. PATENT DOCUMENTS

| 3,884,417 | 5/1975 | Sheffield et al. . | |
|---|---|---|---|
| 3,995,813 | 12/1976 | Bart et al. . | |
| 4,684,104 | 8/1987 | Micard . | |
| 4,762,300 | 8/1988 | Inagaki et al. | 251/129.06 |
| 5,037,062 | 8/1991 | Neuhaus . | |
| 5,217,037 | 6/1993 | Bristol | 251/129.06 X |
| 5,314,118 | 5/1994 | Lembke | 251/129.06 X |
| 5,417,142 | 5/1995 | Lohmann | 251/129.06 X |

FOREIGN PATENT DOCUMENTS

| PCT/EP98/ 05091 | 8/1998 | European Pat. Off. . |
|---|---|---|
| 04262882 | 9/1992 | Japan . |

OTHER PUBLICATIONS

European Search Report PCT/EP98/05091.

*Primary Examiner*—Kevin Lee
*Attorney, Agent, or Firm*—Diller, Ramik & Wight, PC

[57] ABSTRACT

The valve has a chamber (11) in a housing (10), wherein a valve seat (17) closed by a valve body (19) is arranged. The valve seat (17) is abruptly moved by an actuator (15), the valve body (19) not being able to follow due to its inertia and the valve seat (17) being opened a little. Thereafter, the valve body (19) hits a plunger (20) moved by the actuator (15) together with the valve seat (17). By this impact, the valve body (19) is moved fully off from the valve seat (17) so that the outflow opening (13) is cleared entirely. Then, the flow drives the valve body (19) back into the closed position. Using this valve, short switching periods with a large valve opening degree may be achieved.

3 Claims, 1 Drawing Sheet

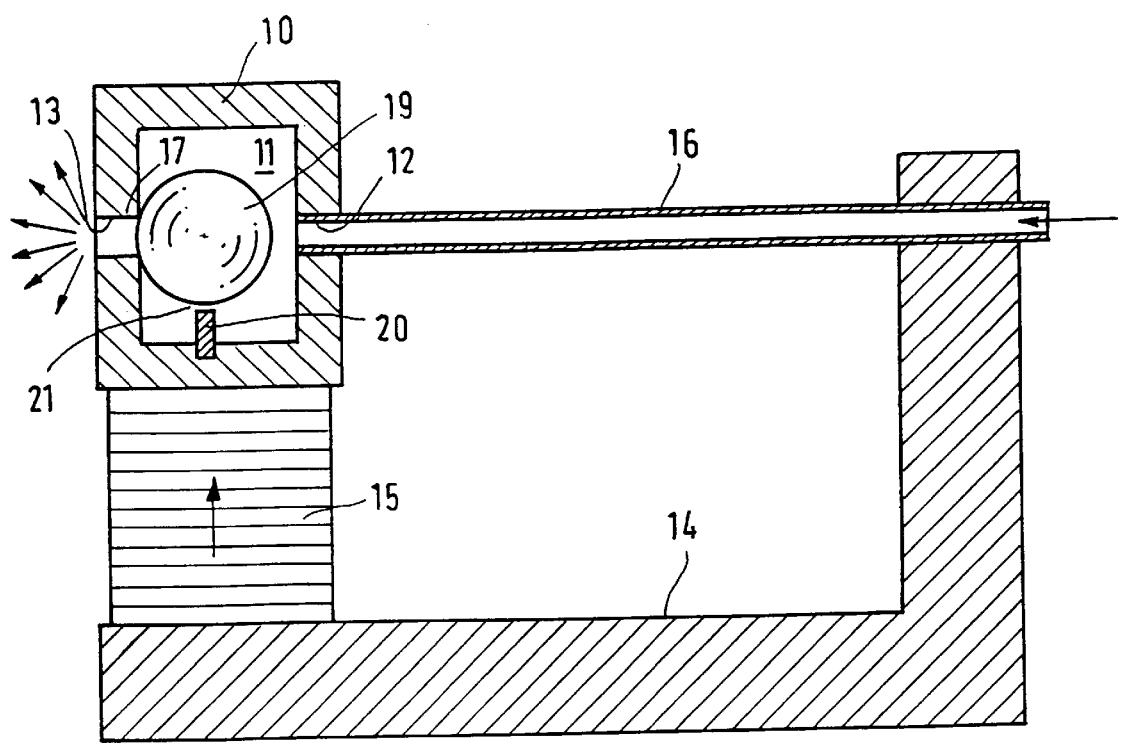

QUICK-ACTION VALVE

BACKGROUND ART

The present invention refers to a quick-action valve with a chamber having an inflow opening and an outflow opening and comprising a valve seat adapted to be closed by a movable valve body.

Particular applications call for quick-action valves that are able to let a fluid flow pass through abruptly and allow for a high switching frequency. Exemplary applications for such valves are spectrometers, wherein gas samples of an exactly defined volume are subjected to a spectrographic analysis, and the energizing of satellite control nozzles, as well as the field of micro systems technology. Such applications require valves with extremely short switching times and high repetition frequency.

From U.S. Pat. No. 5,037,062 a quick-action ball valve is known that comprises a ball seated in the valve seat. By means of an actuating device acting transverse to the valve seat, the ball may be dislodged from the valve seat by an impact from the side. The flow setting in due to this dislocation of the ball returns the ball back onto the valve seat. Valves of this type require a precise alignment of the impact device, and it is difficult to effect a reproducible impact movement.

The prior document PCT/EP98/05091 (published posteriorly) describes a quick-action valve wherein the valve seat is carried by an actuator that, upon an actuation signal, moves the valve seat away from the valve body faster than the valve body can follow. In this design, the distance of the valve body from the valve seat is determined by the amount by which the valve seat moves. Therefore, these valves have only relatively short opening periods.

SUMMARY OF THE INVENTION

It is an object of the present invention, to provide a quick-action valve for gaseous and liquid media that allows for short switching periods, while moving the valve body a considerable distance away from the valve seat so that the valve opening is cleared completely and longer opening periods are possible.

In contrast to the known valves, the valve of the present invention is opened by having the actuator move the valve seat together with a plunger. No relative movement occurs between the plunger and the valve seat. The movement of the valve seat is so fast that the ball initially moves from the valve seat merely because of its own inertia, then hits the plunger and is thrust away from the valve seat by this pulse. The movement of the actuator first serves to separate the ball from the valve seat. Here, the plunger hits the ball, which has just lifted off the valve seat, with a strong pulse which thrusts the ball from the valve seat in the opposite direction. Thus, it is achieved that the ball moves entirely from the valve seat and the valve opening is not only opened but cleared to a greater extent than it would be with a mere displacement.

The present quick-action valve may be designed such that short switching periods in the order of 100 $\mu$s and less are obtained. In practice, repetition frequencies of 400 to 1000 Hz were achieved. Of course, the response speed and the repetition frequency depend on the structural dimensions of the valve and in particular also on the mass of the valve body. The valve body should have a low density so that has a small mass. For example, the valve body may be hollow.

The present valve is particularly intended for switching gases. However, it may also be used for the switching of fluids. The valve is suited, e.g., for fuel injection in internal combustion engines.

Preferably, the actuator carrying the valve seat is designed as a piezoelectric contraction body contracting in response to an actuation signal. As an alternative, the actuator may also operate electro-mechanically, for example. It is essential that, for a short time, a high acceleration of the valve seat is achieved that is higher than the acceleration of the valve body acted upon by the media pressure.

DETAILED DESCRIPTION OF THE DRAWING

The following is a detailed description of an embodiment of the present invention with reference to the sole drawing.

The Figure illustrates a schematic longitudinal section through a quick-action valve of the present invention.

BEST MODE OF CARRYING OUT THE INVENTION

The valve comprises a housing 10 enclosing a chamber 11 that is sealed from the environment. The chamber 11 has an inflow opening 12 and an outflow opening 13 arranged along a common axis. The inflow opening 12 is connected to a pressure source (not illustrated) for the medium to be switched, while the outflow opening 13 is connected to the load or the user.

An actuator 15 carrying the housing 10 is disposed on a stationary mounting means 14. The mounting means 14 further serves to fasten a flexible pipe or hose duct 16 connected with the inflow opening 12.

The actuator 15 is a piezoelectric contraction body comprising a plurality of piezoelectric layers with intermediately arranged thin metal sheets. Thus, a plurality of capacitors are formed with piezoelectric material as the dielectric. When voltage is applied to the sheets, the piezoelectric layers between the sheets expand. When this voltage is reduced or cut off, the layers will contract again.

The valve has a valve seat 17 at the outflow opening 13, the seat being sealable by a valve body 19, which in the present case is a ball. The housing 10 has a plunger 20 in the form of a rigid pin provided thereon, which points radially towards the center of the ball of the valve body 19 when the valve body 19 is in the closed position. The plunger 20 is oriented axially with respect to the actuator 15, i.e. it points in the same direction in which the actuator 15 effects the impact. An interstice or gap 21 in the order of a few $\mu$m is provided between the valve body 19 in the closed position and the plunger 20. Preferably, the valve body 19 and the plunger 20 are made of metal.

The valve illustrated operates as follows: In the closed position, the pressure supplied from the duct 16 prevails in the chamber 11, whereby the valve body 19 is pressed against the valve seat 17. Thus, the outflow opening 13 is closed. The valve body 19 is located a short distance above the plunger 20. For a short opening of the valve, an electrical pulse signal is applied to the actuator 15, whereby the actuator 15 abruptly expands in the longitudinal direction. Thereby, the housing 10 is accelerated transversely to the valve seat 17. The valve body 19 cannot follow the movement of the valve seat 17 due to its inertia so that it opens the valve seat 17 to a small extent. Thereafter, the plunger 20 hits the valve body 19. Due to this resilient impact the valve body 19 is thrust away from the valve seat 17 in the opposite direction of the plunger 20. The plunger 20 is oriented in parallel to the plane of the valve seat 17 and its impact face or end face extends vertically to the plane of the valve seat 17. By thrusting the valve body 19 from the valve seat with the help of the plunger 20, the valve opens and the fluid may now flow past the valve body 19 through the outflow opening 13. By the action of this flow, the valve body 19 is again moved towards the valve seat 17 to eventually close the valve seat again. When the exciting voltage is cut off, the actuator 15 is returned into the contracted state.

The valve is not only operative in the horizontal state represented in the Figure, but it also works in any other orientation. This is due to the fact that the flow forces returning the valve body 19 to the valve seat 17 are far greater than the gravitational forces, provided a sufficient differential pressure between the inflow and the outflow exists.

Although the invention has been described with reference to a specific embodiment, the invention is not limited to the features disclosed. Modifications and variations obvious to the expert in the field are considered to fall within the scope of the invention as defined by the claims.

I claim:

1. A quick-action valve with a chamber (11) having an inflow opening (12) and an outflow opening (13) and comprising a valve seat (17) adapted to be closed by a movable valve body (19), wherein the valve seat (17) is carried by an actuator (15) displacing the valve seat (17) relative to the valve body (19) in response to an actuation signal, and the valve seat is coupled to a plunger hitting the valve body (19) when the valve seat (17) is moved.

2. The quick-action valve of claim 1, wherein the actuator (15) is a piezoelectric body.

3. The quick-action valve of claim 2, wherein the actuator (15) comprises a plurality of piezo material layers with intermediately disposed electrode layers.

* * * * *